United States Patent
Nuttall et al.

(10) Patent No.: US 12,160,864 B2
(45) Date of Patent: Dec. 3, 2024

(54) COORDINATED SATELLITE AND TERRESTRIAL BASE STATION RESOURCE BLOCK SUPPRESSION

(71) Applicant: Skylo Technologies, Inc., Palo Alto, CA (US)

(72) Inventors: Andrew Nuttall, Mountain View, CA (US); Meghna Agrawal, Cupertino, CA (US); Christopher Acker, Los Altos, CA (US); Vijay Lewis, Wylie, TX (US)

(73) Assignee: Skylo Technologies, Inc., Palo Alto, CA (US)

( * ) Notice: Subject to any disclaimer, the term of this patent is extended or adjusted under 35 U.S.C. 154(b) by 410 days.

(21) Appl. No.: 17/734,082

(22) Filed: May 1, 2022

(65) Prior Publication Data

US 2023/0354337 A1 Nov. 2, 2023

(51) Int. Cl.
*H04W 4/00* (2018.01)
*H04W 16/14* (2009.01)
*H04W 72/044* (2023.01)
*H04W 72/20* (2023.01)
*H04W 84/06* (2009.01)

(52) U.S. Cl.
CPC ........... *H04W 72/20* (2023.01); *H04W 16/14* (2013.01); *H04W 72/044* (2013.01); *H04W 84/06* (2013.01)

(58) Field of Classification Search
CPC ... H04W 72/20; H04W 16/14; H04W 72/044; H04W 84/06; H04B 7/18513
USPC ........................................................ 455/427
See application file for complete search history.

(56) References Cited

U.S. PATENT DOCUMENTS

| | | | |
|---|---|---|---|
| 6,091,933 A | 7/2000 | Sherman et al. | |
| 6,157,811 A | 12/2000 | Dent | |
| 6,157,834 A | 12/2000 | Helm et al. | |
| 6,463,279 B1 | 10/2002 | Sherman et al. | |
| 6,892,068 B2 | 5/2005 | Karabinis et al. | |
| 7,587,171 B2 | 9/2009 | Evans et al. | |
| 8,494,458 B2 * | 7/2013 | Tucker | H04W 84/08 455/410 |
| 9,048,973 B2 * | 6/2015 | Yamamoto | H04W 52/243 |
| 9,420,491 B2 | 8/2016 | Bacquet et al. | |
| 10,098,132 B2 * | 10/2018 | Tucker | H04W 4/24 |

(Continued)

*Primary Examiner* — Amancio Gonzalez
(74) *Attorney, Agent, or Firm* — Brian R. Short

(57) ABSTRACT

Apparatuses, methods, and systems for coordinating satellite and terrestrial base station resource block suppression are disclosed. One method includes receiving, by a controller, a data demand of a terrestrial network of a terrestrial base station and a data demand of a satellite network of a satellite base station, generating a communication schedule which contains terrestrial resource block suppression information and satellite resource block suppression information, wherein the terrestrial resource block suppression information indicates time and frequency blocks of the communication schedule that the terrestrial base station is to suppress wireless communications, and the satellite resource block suppression information indicates time and frequency blocks of the communication schedule that the satellite base station is to suppress wireless communications, allocating, by the terrestrial base station, resources based on the terrestrial resource block suppression information, and allocating, by the satellite base station, resources based on the satellite resource block suppression information.

21 Claims, 14 Drawing Sheets

(56) References Cited

U.S. PATENT DOCUMENTS

| | | | |
|---|---|---|---|
| 10,560,955 B2* | 2/2020 | Shoshan | H04W 72/04 |
| 10,886,958 B2* | 1/2021 | Liao | H04B 1/12 |
| 10,897,703 B2* | 1/2021 | Jiang | H04W 8/24 |
| 11,287,962 B2* | 3/2022 | Ladd | G06F 8/70 |
| 11,432,367 B2* | 8/2022 | Dutta | H04W 24/02 |
| 11,621,768 B2* | 4/2023 | Ma | H04B 7/18539 |
| | | | 370/316 |
| 11,722,215 B1* | 8/2023 | Bhaskar | H04B 7/18513 |
| | | | 370/316 |
| 11,949,505 B2* | 4/2024 | Nammi | H04L 1/0026 |
| 11,997,733 B2* | 5/2024 | Cherian | H04W 76/34 |
| 12,028,781 B2* | 7/2024 | Selvanesan | H04W 4/025 |
| 2002/0123343 A1 | 9/2002 | Wiedeman et al. | |
| 2003/0022625 A1 | 1/2003 | Otten et al. | |
| 2004/0117427 A1* | 6/2004 | Allen | H04N 21/6543 |
| | | | 709/200 |
| 2014/0101312 A1* | 4/2014 | Huang | H04L 65/613 |
| | | | 709/225 |
| 2022/0377614 A1* | 11/2022 | Balakrishnan | H04W 28/0925 |
| 2023/0199545 A1* | 6/2023 | Arad | H04B 7/18504 |
| | | | 370/329 |
| 2024/0022927 A1* | 1/2024 | Tong | H04W 4/40 |
| 2024/0250772 A1* | 7/2024 | Nammi | H04L 5/005 |
| 2024/0284484 A1* | 8/2024 | Zhang | H04W 68/025 |

\* cited by examiner

Receiving, by a controller, a data demand of a terrestrial network of a terrestrial base station and a data demand of a satellite network of a satellite base station

1310

Generating, by the controller, a communication schedule which contains terrestrial resource block suppression information of the terrestrial base station and satellite resource block suppression information of the satellite base station, wherein the terrestrial resource block suppression information indicates time and frequency blocks of the communication schedule that the terrestrial base station is to suppress wireless communications, and the satellite resource block suppression information indicates time and frequency blocks of the communication schedule that the satellite base station is to suppress wireless communications

1320

Allocating, by the terrestrial base station, radio frequency (RF) resources based on the terrestrial resource block suppression information

1330

Allocating, by the satellite base station, radio frequency (RF) resources based on the satellite resource block suppression information

```
┌─────────────────────────────────────────────────────────────────────────────┐
│ Receiving, by a controller, a data demand of a terrestrial network of a terrestrial base station and │
│             a data demand of a satellite network of a satellite base station │
│                                                                             │
│                                    1410                                     │
└─────────────────────────────────────────────────────────────────────────────┘
                                      │
                                      ▼
┌─────────────────────────────────────────────────────────────────────────────┐
│   Generating, by the controller, a communication schedule which contains terrestrial resource │
│  block information of the terrestrial base station and satellite resource block information of the │
│     satellite base station, wherein the terrestrial resource block information indicates time and │
│ frequency blocks of the communication schedule that the terrestrial base station is only allowed │
│ to use for wireless communications, and the satellite resource block information indicates time │
│    and frequency blocks of the communication schedule that the satellite base station is only │
│       allowed to use for wireless communication, wherein the time and frequency blocks of the │
│ terrestrial resource block information do not overlap with the time and frequency blocks of the │
│                            satellite resource block information │
│                                                                             │
│                                    1420                                     │
└─────────────────────────────────────────────────────────────────────────────┘
                                      │
                                      ▼
┌─────────────────────────────────────────────────────────────────────────────┐
│ Allocating, by the terrestrial base station, radio frequency (RF) resources based on the terrestrial │
│                              resource block information                     │
│                                                                             │
│                                    1430                                     │
└─────────────────────────────────────────────────────────────────────────────┘
                                      │
                                      ▼
┌─────────────────────────────────────────────────────────────────────────────┐
│   Allocating, by the satellite base station, radio frequency (RF) resources satellite based on the │
│                              satellite resource block information           │
│                                                                             │
│                                    1440                                     │
└─────────────────────────────────────────────────────────────────────────────┘
```

Figure 14

COORDINATED SATELLITE AND TERRESTRIAL BASE STATION RESOURCE BLOCK SUPPRESSION

FIELD OF THE DESCRIBED EMBODIMENTS

The described embodiments relate generally to wireless communications. More particularly, the described embodiments relate to systems, methods, and apparatuses for coordinated satellite and terrestrial base station resource block suppression.

BACKGROUND

Current data networks are designed primarily for human users and the network and traffic characteristics that human users generate. The growth and proliferation of low-cost embedded wireless sensors and devices pose a new challenge of high volumes of low bandwidth devices vying for access to limited network resources. One of the primary challenges with these new traffic characteristics is the efficiency at which the shared network resources can be used. For common low bandwidth applications such as GPS tracking, the efficiency (useful/useless data ratio) can often be below 10%. This inefficiency is the result of large volumes of devices communicating in an uncoordinated environment. Addressing this problem is fundamental to the future commercial viability of large-scale sensor network deployments.

It is desirable to have methods, apparatuses, and systems for coordinated satellite and terrestrial base station resource block suppression.

SUMMARY

An embodiment includes a method of coordinating satellite and terrestrial base station resource block suppression. The method including receiving, by a controller, a data demand of a terrestrial network of a terrestrial base station and a data demand of a satellite network of a satellite base station, generating, by the controller, a communication schedule which contains terrestrial resource block suppression information of the terrestrial base station and satellite resource block suppression information of the satellite base station, wherein the terrestrial resource block suppression information indicates time and frequency blocks of the communication schedule that the terrestrial base station is to suppress wireless communications, and the satellite resource block suppression information indicates time and frequency blocks of the communication schedule that the satellite base station is to suppress wireless communications, allocating, by the terrestrial base station, radio frequency (RF) resources based on the terrestrial resource block suppression information, and allocating, by the satellite base station, radio frequency (RF) resources based on the satellite resource block suppression information.

Another embodiment includes a satellite wireless communication system. The system includes a terrestrial base station, a satellite base station, and a controller. The controller operates to receive a data demand of a terrestrial network of a terrestrial base station and a data demand of a satellite network of a satellite base station, and generate a communication schedule which contains terrestrial resource block suppression information of the terrestrial base station and satellite resource block suppression information of the satellite base station, wherein the terrestrial resource block suppression information indicates time and frequency blocks of the communication schedule that the terrestrial base station is to suppress wireless communications, and the satellite resource block suppression information indicates time and frequency blocks of the communication schedule that the satellite base station is to suppress wireless communications. The terrestrial base station operates to allocate radio frequency (RF) resources based on the terrestrial resource block suppression information, and the satellite base station operates to allocate radio frequency (RF) resources based on the satellite resource block suppression information.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 13 is a flow chart that includes steps of a method for coordinated satellite and terrestrial base station resource block suppression, according to an embodiment.

FIG. 14 is a flow chart that includes steps of a method for coordinated satellite and terrestrial base station resource blocks, according to an embodiment.

DETAILED DESCRIPTION

The embodiments described include methods, apparatuses, and systems for coordinated satellite and terrestrial base station resource block suppression. For an embodiment, transmission of wireless signal of a satellite base station or a terrestrial base station over suppressed resource blocks is to have a transmission power level below a selected threshold, to avoid causing interference with wireless communication of the other of the satellite base station or the terrestrial base station.

Figure 1:
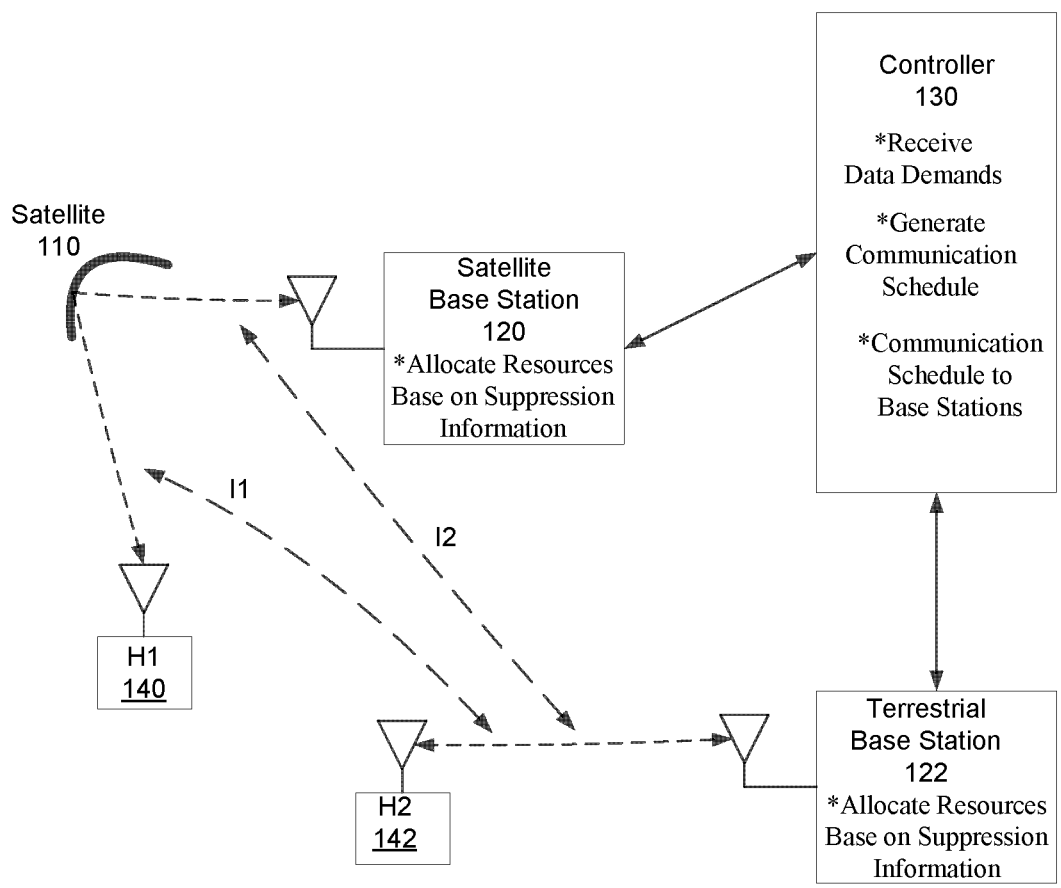
FIG. 1 shows a system for coordinating resource block suppression of satellite and terrestrial networks, according to an embodiment.

FIG. 1 shows a system for coordinating resource block suppression of satellite and terrestrial networks, according to an embodiment. As shown, a controller 130 receives a data demand of a terrestrial network of a terrestrial base station 122 and a data demand of a satellite network of a satellite base station 120. For the satellite and terrestrial networks, the data demand can depend upon the geographical area, number of users in an environment or the geographical area, and a data demand of the users. Further, the wireless communication channels of both the satellite and terrestrial networks can change over time.

The controller 130 generates a communication schedule which contains terrestrial resource block suppression information of the terrestrial base station 122 and satellite resource block suppression information of the satellite base station 120, wherein the terrestrial resource block suppression information indicates time and frequency blocks of the communication schedule that the terrestrial base station is to suppress wireless communications, and the satellite resource block suppression information indicates time and frequency blocks of the communication schedule that the satellite base station is to suppress wireless communications.

For an embodiment, the number of resource blocks available for the communication schedule is limited. For an embodiment, the number of resource blocks available for the communication schedule is a set number over time. For an embodiment, the satellite resource block suppression information includes resource blocks within the communication schedule that the satellite base station 120 of the satellite network must maintain at transmission levels below one or more thresholds to reduce interference with scheduled resource blocks of the terrestrial network. For an embodiment, the terrestrial resource block suppression information includes resource blocks within the communication schedule that the terrestrial base station 122 of the satellite network must maintain at transmission levels below one or more thresholds to reduce interference with scheduled resource blocks of the satellite network.

For an embodiment, standards bodies define resource blocks that are allocated for the terrestrial network and the satellite network. For an embodiment, at least some of the resource blocks are overlapping between the terrestrial network and the satellite network. For an embodiment, resource blocks allocated to at least one of the terrestrial network and the satellite network are suppressed to allow for better spectral efficiency. That is, for example, suppression of terrestrial resource blocks as specified by the terrestrial resource block suppression information can allow for wireless communications within the terrestrial network over the terrestrial suppressed resource blocks while simultaneously allowing for wireless communications within the satellite network over the same terrestrial suppressed resource blocks. That is, the wireless communication within the terrestrial network includes wireless communications signals that are maintained below a predetermined power threshold that may be strong enough of wireless signals to allow for wireless communications within the terrestrial network, but low enough of wireless signals to mitigate interference with the wireless communications within the satellite network. That is, the controller 130 can operate to identify the time/frequency and physical location where both terrestrial and satellite coverage is required. For these time/frequency and physical locations, controller 130 can select certain resource block to be suppressed such that data demand can be met for the terrestrial and satellite networks over a contested resource.

For an embodiment, generation of the communication schedule which contains terrestrial resource block suppression information of the terrestrial base station 122 and satellite resource block suppression information of the satellite base station 120 is time and/or location based to create an environment where data demands can be generated. For an embodiment, the terrestrial and the satellite networks include command and response protocols, so a network must make itself available (for example, by broadcasting availability) for the terrestrial and the satellite networks to be able to receive data demands from devices (hubs). For an embodiment, the controller generates the communication schedule to ensure minimum connectivity over a geographical area while defining suppression schedules. For example, one of the objectives for controllers is to minimize coverage holes in addition to meeting data demand.

Once the terrestrial base station 122 receives the communication schedule, the terrestrial base station 122 allocates radio frequency (RF) resources based on the terrestrial resource block suppression information. The RF resources of the terrestrial base station 122 includes resource blocks allocated by the controller to the terrestrial base station that are then allocated by the terrestrial base station 122 for wireless communication with hubs wirelessly connected to the terrestrial base station 122. It is to be understood that the terrestrial base station 122 may leave some resource block unscheduled. For example, the present demand of the users (hubs) wirelessly connected to the terrestrial base station 122 may not require use of all the resource blocks allocated to the terrestrial base station 122.

Once the satellite base station 120 receives the communication schedule, the satellite base station 120 allocates radio frequency (RF) resources based on the satellite resource block suppression information. The RF resources of the satellite base station 120 includes resource blocks allocated by the controller to the satellite base station that are then allocated by the satellite base station 120 for wireless communication with hubs wirelessly connected to the satellite base station 120. It is to be understood that the satellite base station 120 may leave some resource blocks unscheduled. For example, the present demand of the users (hubs) wirelessly connected to the satellite base station 120 may not require use of all of the resource blocks allocated to the satellite base station 120.

For an embodiment, the terrestrial resource block suppression information provides an indication to the terrestrial base station 122 how much to suppress wireless communications within indicated time and frequency blocks. For an embodiment, a scheduler of the terrestrial base station scheduler allocates different power for the transmit resource blocks based upon which resource blocks are allocated and used for transmission. For example, the controller can recommend different power for different resource blocks depending upon a channel to interference ratio observed in the overlapping coverage area.

For an embodiment, the satellite resource block suppression information provides an indication to the satellite base station 120 how much to suppress wireless communications within indicated time and frequency blocks. For an embodiment, a scheduler of the satellite base station scheduler allocates different power for the transmit resource blocks based upon which resource blocks are allocated and used for transmission. For example, the controller 130 can recommend different power for different resource blocks depending upon a channel to interference ratio observed in the overlapping coverage area.

At least some embodiments further include dividing the resource blocks into smaller resource units RUs). For an embodiment, a terrestrial base station scheduler of the terrestrial base station 122 and/or a satellite base station scheduler of the satellite base station 120 controls suppression of the smaller RUs based on suppression information received from the controller 130 and received from user elements (such as, hubs 140, 142). Further, the terrestrial base station scheduler of the terrestrial base station 122 and/or the satellite base station scheduler of the satellite base station 120 controls suppression of the smaller RUs based locations of the user elements (such as, hubs 140, 142).

For an embodiment, an RF channel controller of the terrestrial base station adjusts an attenuation of transmission signals within suppressed resource blocks to reduce interference with satellite wireless communications. For an embodiment, a scheduler of the terrestrial base station operates to allocate different levels of transmit power for different resource blocks allocated to the terrestrial base station based upon which resource block is being used for transmission. For example, the controller can recommend different power for different allocated resource blocks depending on the channel to interference ratio observed in an overlapping (physical overlap between terrestrial and satellite) coverage area. Further, for an embodiment, an RF channel controller of the terrestrial base station can adjust out-of-band attenuation and filtering according to the level of suppression (transmission dB) recommended by the controller for the suppressed resource blocks.

For an embodiment, the satellite resource block suppression information provides an indication to the satellite base station 122 how much to suppress wireless communications within indicated time and frequency blocks. For at least some embodiments, the level of suppression is further based on the channel attenuation between a terrestrial device (hub) and the terrestrial transmitter (base station) and the channel attenuation between the satellite device (hub) and the satellite transmitter (base station). The channel attenuation is the amount of signal attenuation outside of the frequency range of the wireless channel being used to communicate between the hubs and the terrestrial base station or the satellite base station.

Figure 11:
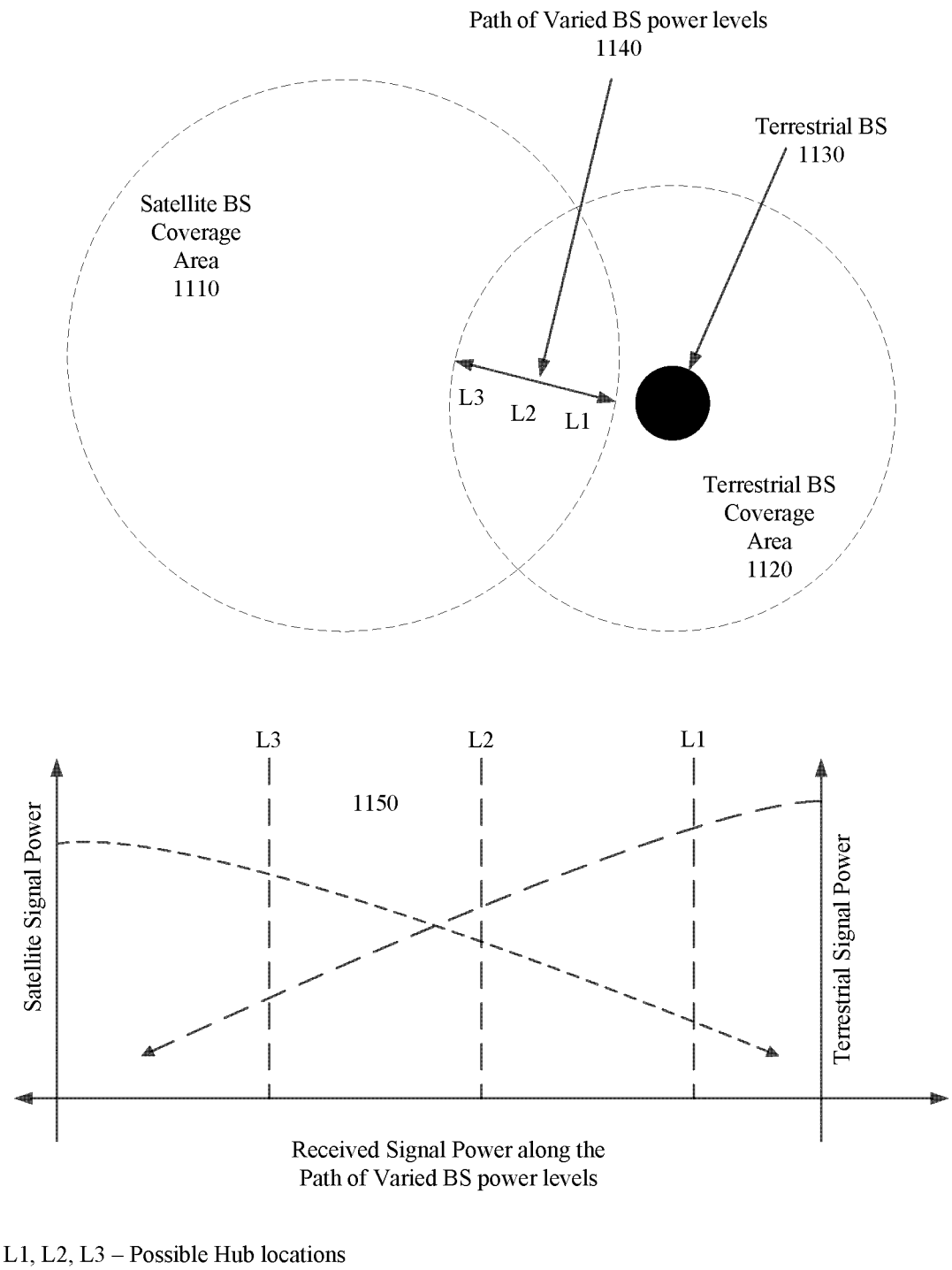
FIG. 11 shows coverage areas of a satellite network and of a terrestrial network and shows varying wireless signal power levels of various physical locations within the coverage areas, according to an embodiment.

For at least some embodiments, the level of suppression is additionally or alternatively based on a location of a hub (wireless device) the terrestrial base station and the satellite base station are wirelessly connected to. As shown in FIG. 11, the wireless signal power of the terrestrial base station and the satellite base station can vary over the wireless coverage areas of the terrestrial base station and the satellite base station. Accordingly, the amount of signal suppression needed by either one of the base stations can vary by the physical location of the wireless device (hub). Further, the level of suppression can be additionally or alternatively based on a location of the terrestrial base station and/or the coverage area of the satellite base station.

The communication schedule generated by the controller 130 which contains terrestrial resource block suppression information of the terrestrial base station 122 and satellite resource block suppression information of the satellite base station 120, operates to reduce interference between the terrestrial wireless communications and the satellite wireless communications. Interference (I1) can occur, for example, between wireless links of proximate hubs (such as, hubs 140, 142). That is, the terrestrial wireless link between the hub 142 and the terrestrial base station 122 can interfere (and be interfered with) with the satellite wireless link between the hub 140 and a satellite 110. Further, interference (I2) can occur, for example, between the wireless links of proximate base stations. That is, the terrestrial wireless link between the hub 142 and the terrestrial base station 122 can interfere (and be interfered with) with the satellite wireless link between the satellite 110 and the satellite base station 120.

Figure 2:
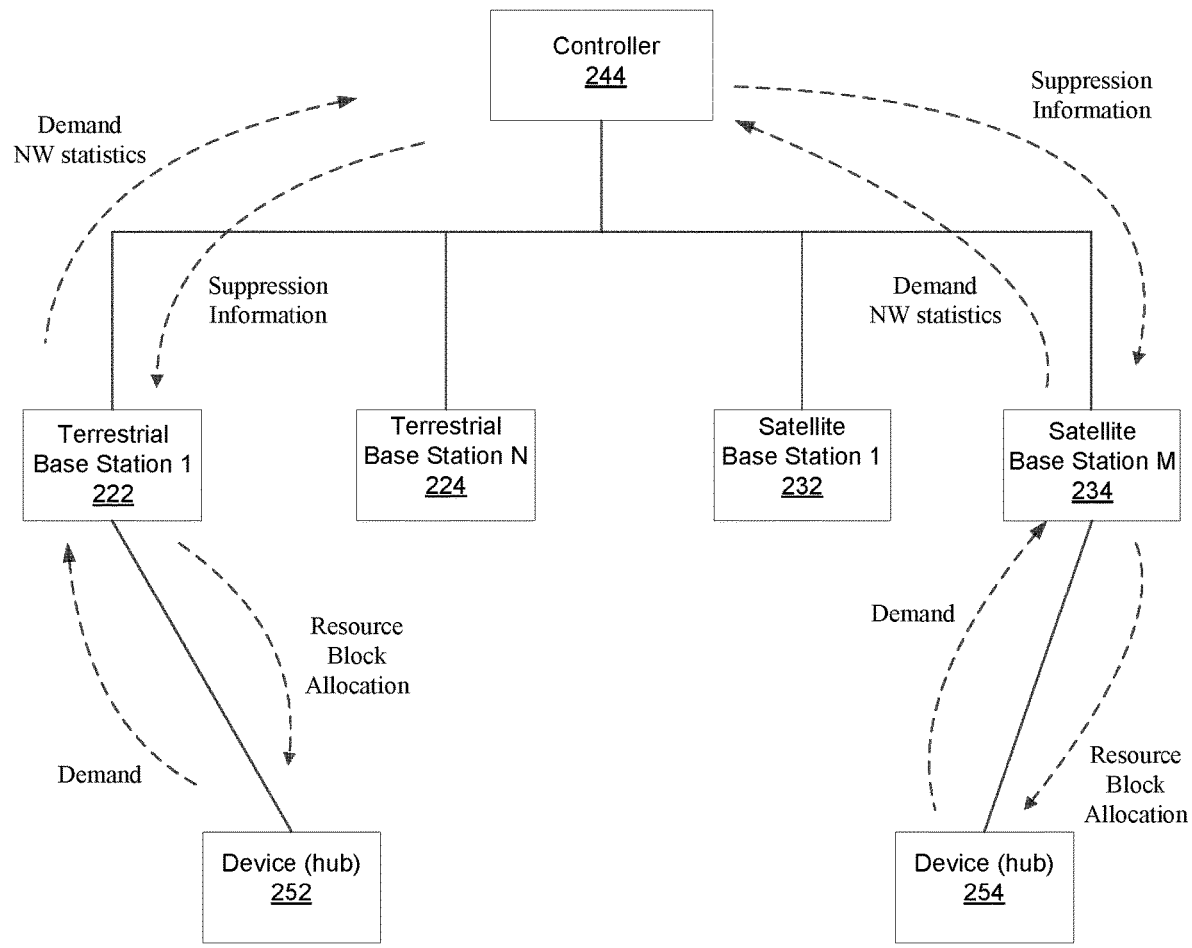
FIG. 2 shows a block diagram of N terrestrial network base stations and M satellite network base stations and a controller for coordinating resource block suppression of the satellite and terrestrial networks, according to an embodiment.

FIG. 2 shows a block diagram of N terrestrial network base stations 222, 224, M satellite network base stations 232, 234, and a controller 244 for coordinating resource block suppression of the satellite and terrestrial networks, according to an embodiment. As previously described, the controller 244 generates the communication schedule which contains terrestrial resource block suppression information of the terrestrial base stations 222, 224 and satellite resource block suppression information of the satellite base stations 232, 234. Further, as previously described, the communication schedule is generated at least in part by data demands and network statistics including at least one of channel utilization, registered device base, coverage area, and time of day provided by the base stations of the terrestrial network and the satellite network.

As shown, the suppression information of the terrestrial resource block suppression information and satellite resource block suppression information is provided to the base stations 222, 224, 232, 234. Based on the suppression information, the base stations 222, 224, 232, 234 allocated resource blocks to terrestrial hubs (such as, hub 252) and to satellite hubs (such as, hub 254). The base stations 222, 224, 232, 234 allocated resource blocks may further allocate resource blocks to the hubs 232, 234 based on demand information of the hubs 232, 234.

Figure 3:
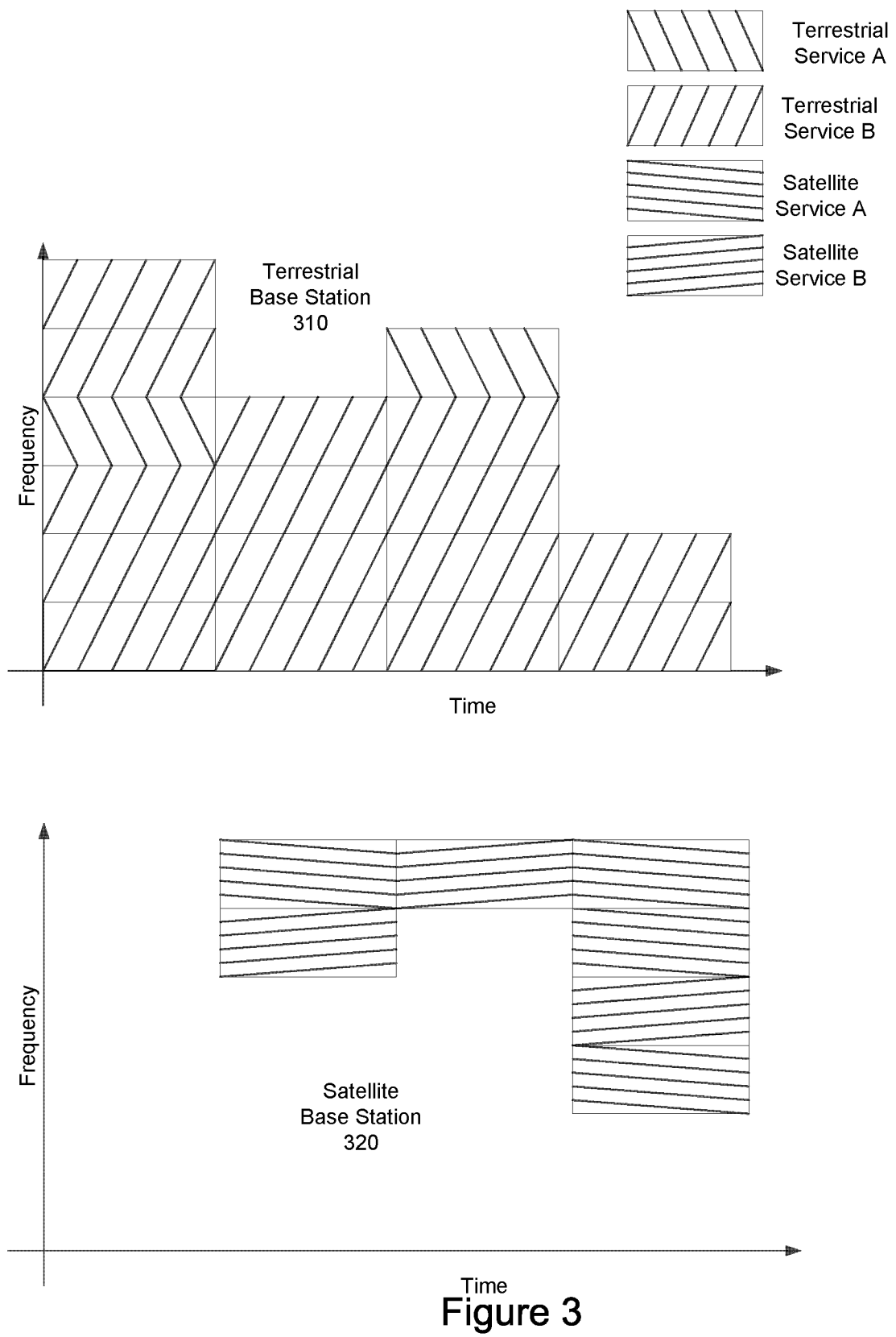
FIG. 3 shows resource block suppression schedules of a terrestrial base station and a satellite base station, according to an embodiment.

FIG. 3 shows resource block suppression schedules 310, 320 of a terrestrial base station and a satellite base station, according to an embodiment. For an embodiment, the previously described communication schedule generated by the controller includes the resource block suppression schedules 310, 320. For an embodiment, the communication schedule includes a set number of time and frequency resource blocks.

For an embodiment, the resource blocks allocated to the terrestrial base station of the block suppression schedule 310 indicate the resource blocks of the communication schedule that the terrestrial base station is free to allocate resources for wireless communication to its users (hubs). The resource blocks of the communication schedule not allocated to the terrestrial base station are the resource blocks that are to be suppressed. As previously described, the level of suppression can be selected to be less than a threshold. Further, for an embodiment, the level of suppression can be selected or adapted. For an embodiment, the level of suppression is dependent on a physical location of a device (hub) that is maintaining a wireless connection with the terrestrial base station and the satellite base station. For an embodiment, the level of suppression is dependent on the distance of a device (hub) that is maintaining a wireless connection with the terrestrial base station and the satellite base station from the terrestrial base station.

As shown, for an embodiment, block suppression schedule 310 can include resource blocks that the terrestrial base station can allocated to multiple services, such as, terrestrial service A and terrestrial service B. For an embodiment, services may have different locations of base stations, different resource block sizes, different modulation and coding schemes, different communication delaying timings, different QoS, and spectrum bands, all of which affect the characteristics (time, frequency, level) of the controller coordinated suppression information.

For an embodiment, the resource blocks allocated to the satellite base station of the block suppression schedule 320 indicate the resource blocks of the communication schedule that the satellite base station is free to allocate resources for wireless communication to its users (hubs). The resource blocks of the communication schedule not allocated to the satellite base station are the resource blocks that are to be suppressed. As previously described, the level of suppression can be selected to be less than a threshold. Further, for an embodiment, the level of suppression can be selected or adapted. For an embodiment, the level of suppression is dependent on a physical location of a device (hub) that is maintaining a wireless connection with the terrestrial base station and the satellite base station. For an embodiment, the level of suppression is dependent on the distance of a device (hub) that is maintaining a wireless connection with the terrestrial base station and the satellite base station from the terrestrial base station.

As shown, for an embodiment, block suppression schedule 320 can include resource blocks that the satellite base station can allocate to multiple services, such as, satellite service A and satellite service B. For an embodiment, services may have different locations of base stations, different resource block sizes, different modulation and coding schemes, different communication delaying timings, different QoS, and spectrum bands, all of which affect the characteristics (time, frequency, level) of the controller coordinated suppression information. Further, the satellite services may include different types of satellite constellations, such as, LEO, MEO, and/or GEO, and different numbers of satellites, such as, 5 satellites versus 100 satellites, versus 1000 satellites, etc.

Figure 4:
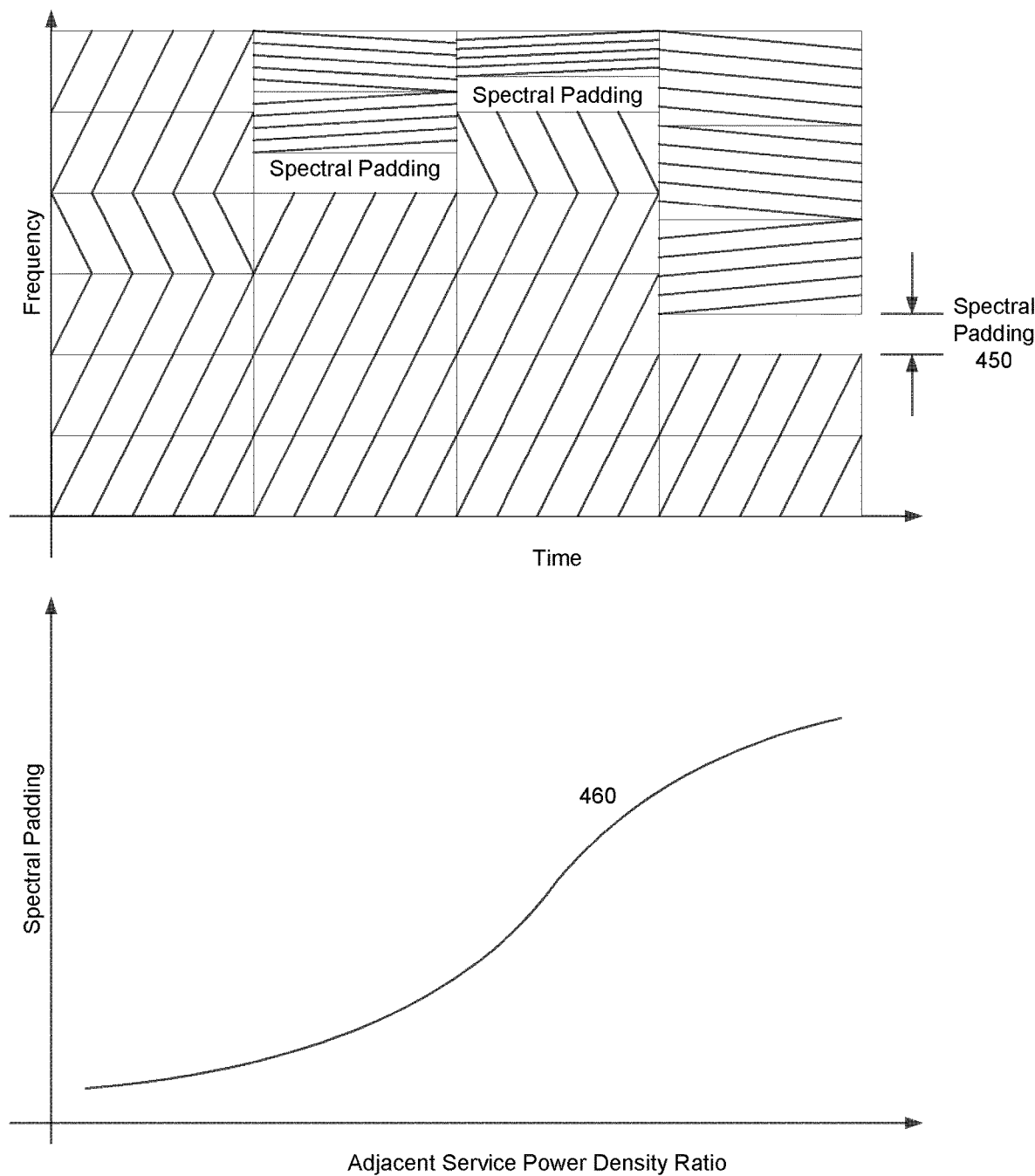
FIG. 4 shows a communication schedule of a terrestrial base station and a satellite base station that includes spectral padding, according to an embodiment.

FIG. 4 shows a communication schedule of a terrestrial base station and a satellite base station that includes spectral padding 450, according to an embodiment. For an embodiment, the spectral padding 450 is included to reduce interference between resource blocks allocated for terrestrial wireless communications and resource blocks allocated for satellite wireless communications. At least some wireless signal energy of wireless communications of one resource block will spill over to a frequency adjacent resource block. However, if the wireless signal energy is low enough (such as, below a threshold) then the wireless signal energy does not cause enough interference to be a problem. For an embodiment, the spectral padding 450 increases an amount of frequency spectrum between adjacent resource blocks to reduce the amount of wireless signal energy from adjacent resource blocks that spills over to the adjacent resource block.

For an embodiment, a width of the spectral padding 450 is selected based on an adjacent service power density ratio 460 between adjacent resource blocks as shown in FIG. 4.

The adjacent service power density ratio is the ratio of the power of the service (wireless communication) operating in an allocated resource block to that of the service operating in an adjacent time or frequency suppressed resource block. The power density ratio represents a carrier to interference ratio for that service, which has a threshold value that must be met for successful data transfer. For an embodiment the spectral padding may be further based upon the location of the wireless devices (hubs). As shown in FIG. 11 the wireless signal energy can vary depending on the location of the wireless devices (hubs). Accordingly, spectral padding reduces wireless signal energy interference between the terrestrial and the satellite base stations can accordingly vary. That is, if the level of interference is less, the spectral padding can be reduced. If the level of interference is greater, then the spectral padding is increased. The level of interference between the terrestrial and the satellite networks can vary according to the location of the wireless device (hub), the coverage area of the satellite base station, and/or the location of the terrestrial base station. For example, when the wireless device (hub) is near the edge of terrestrial and satellite coverage areas, then the terrestrial scheduler can avoid resource blocks which are suppressed for that location and schedule resources from the resource blocks that are not suppressed. In this way, both terrestrial and satellite coverage is available for the wireless device at the same time. For an embodiment, the suppressed resource blocks of the terrestrial resource block suppression information and satellite resource block suppression information ensure that the carrier to interference ratio of wireless signals received by the wireless device is above the required threshold.

For an embodiment, the spectral padding 450 is selected based upon a prescribed suppression threshold level and an interference tolerance of the terrestrial and satellite wireless services. For an embodiment, the spectral padding 450 is selected according to a channel to interference ratio. Additionally, filtering as will be described, along with the spectral padding 450 can be dynamically adjusted by controller based on the sensed interference, signal quality, data demand, geographical/environment changes. For an embodiment, the spectral padding 450 is selected based at least in part on a physical location of a wireless device (hub) that maintains wireless communication with the terrestrial base station and the satellite base station. For an embodiment, the spectral padding 450 is selected based at least in part on the distance of a wireless device (hub) that maintains wireless communication with the terrestrial base station and the satellite base station from the terrestrial base station. For an embodiment, the spectral padding is selected based at least in part on doppler information of a satellite of the satellite network. The motion of, for example, a LEO (low earth orbit) satellite induces a time varying doppler shift. For an embodiment, the spectral padding between the LEO and terrestrial service is selected to match the doppler shift induced by the satellite and the relative location between the satellite and the terrestrial base station.

Figure 5:
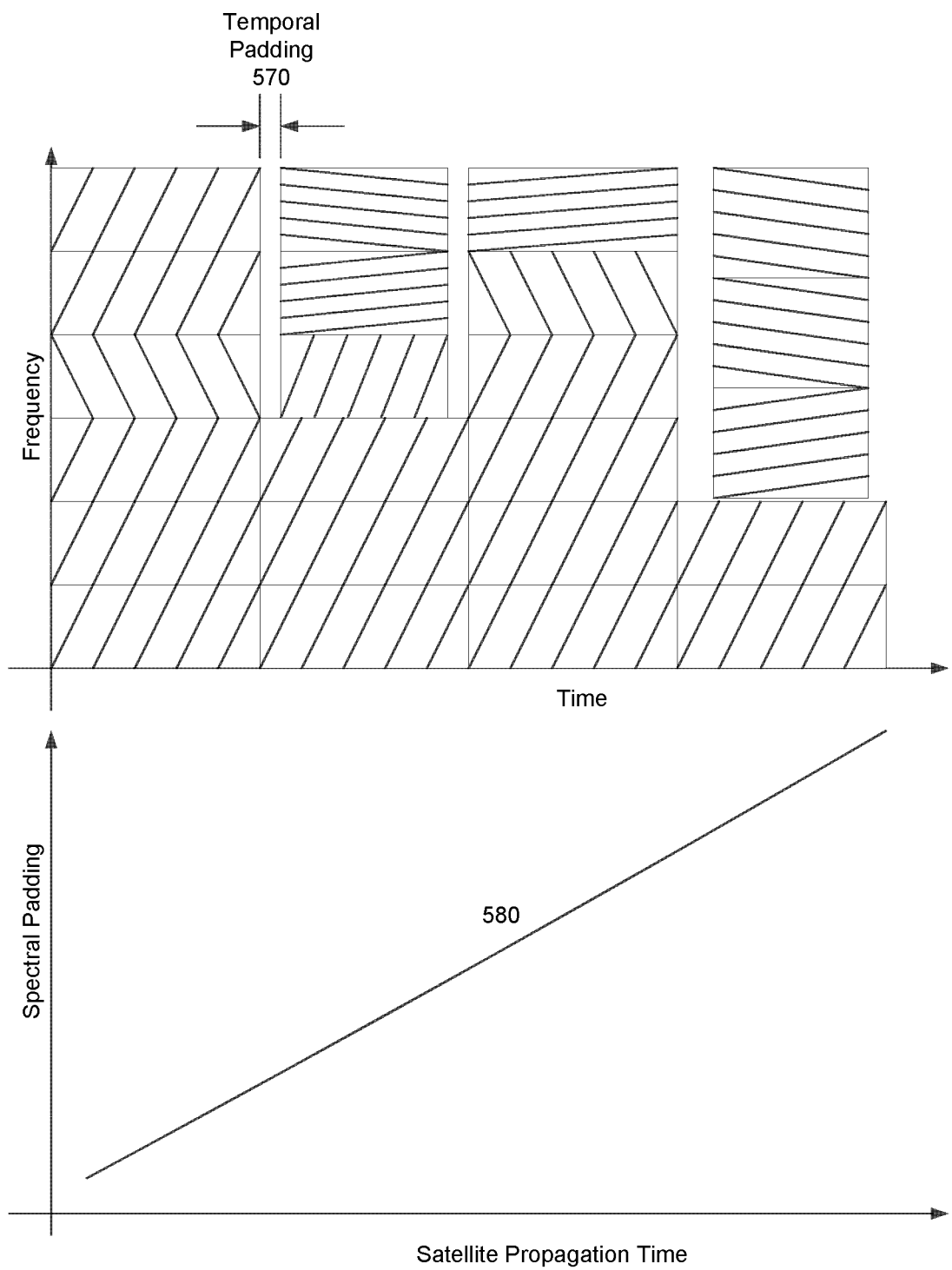
FIG. 5 shows a communication schedule of a terrestrial base station and a satellite base station that includes temporal padding, according to an embodiment.

FIG. 5 shows a communication schedule of a terrestrial base station and a satellite base station that includes temporal padding 570, according to an embodiment. For an embodiment, the temporal padding includes the insertion of a time pad between terrestrial resource blocks and satellite resource blocks.

For an embodiment, the temporal padding is selected based at least on a propagation delay 580 of the satellite wireless communication of the satellite resource blocks. The propagation delay of wireless communication between the satellite base station and the hub 140 is much longer than the propagation delay of wireless communication between the terrestrial base station and the hub 142. Accordingly, for an embodiment, the communication schedule that includes resource block allocations for both the satellite base station 120 and the terrestrial base station 122 accounts at least partially for the differences in the propagation delays between the terrestrial network and the satellite network by including the temporal padding 570. Further, the time duration of the temporal padding 570 can be dynamically selected based on the satellite propagation delay. Further, for an embodiment, the temporal padding 570 is dynamically selected based on motion of the satellite.

For an embodiment, the satellite propagation delay time is the temporal padding. That is, when the communication schedule includes both allocations for a terrestrial base station and a satellite base station, the temporal padding between time adjacent resource blocks is set equal to the propagation delay between the wireless device (hub) and the satellite base station. For another embodiment, the temporal padding is set to the difference in propagation delay between the two systems. For an embodiment, the temporal padding is selected based at least in part on a controller coordination characteristic time constant. The controller coordination characteristic time constant reflects the controller's ability to coordinate suppression information and receive acknowledgements back between the disparate satellite and terrestrial networks. When the controller coordination characteristic time constant is large, discrepancies may form around resource blocks which have been scheduled for future time slots. For an embodiment, additional padding may be required to allow already allocated (but not yet in transmitted) data to resolve. As previously stated, the temporal padding may be dependent on the propagation delay and satellite motion. For example, when a LEO satellite is moving from one area to another there can be a period of time when multiple satellites are covering an area simultaneously. The temporal padding can be selected to reduce interference when the overlapping coverage occurs. Further, there can be periods in which none of the satellites are covering the area, or a satellite can be covering half of one cell (terrestrial) area and half of another.

Figure 6:
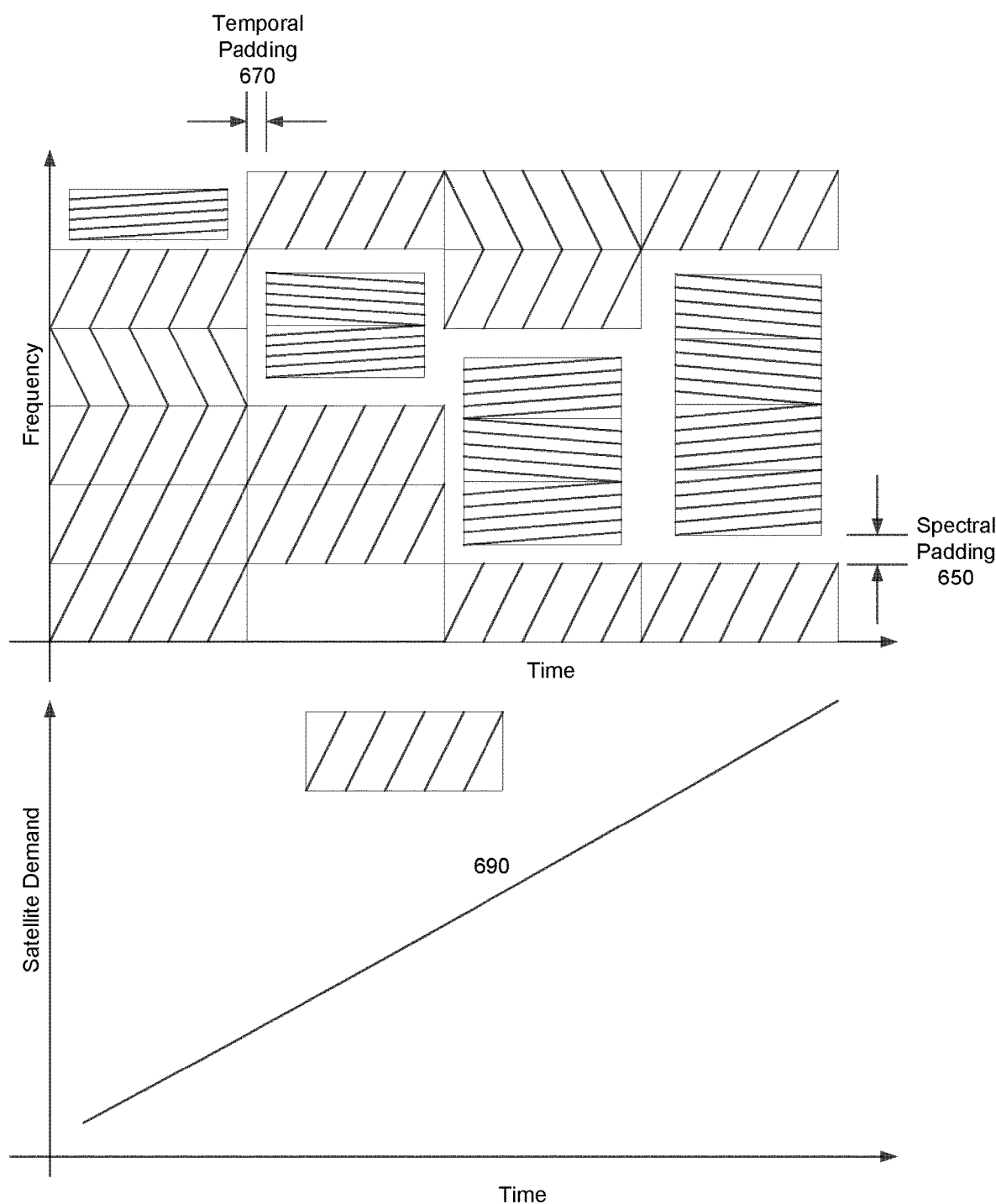
FIG. 6 shows a communication schedule of a terrestrial base station and a satellite base station that includes spectral padding and temporal padding, and allocation changes over time, according to an embodiment.

FIG. 6 shows a communication schedule of a terrestrial base station and a satellite base station that includes spectral padding 650 and temporal padding 670, according to an embodiment. As previously described, the spectral padding 650 and temporal padding 670 provide additional suppression of wireless signal energy between terrestrial wireless communications and satellite wireless communications.

For an embodiment, the terrestrial block suppression is selected based at least on satellite network traffic demands as shown by the plot 690. Accordingly, for an embodiment, the spectral padding 650 and temporal padding 670 are selected based at least in part on the demands of the satellite network. Further, the number of resource blocks allocated between the terrestrial network and the satellite network is selected based on the data demands of the terrestrial network and the satellite network. As shown in FIG. 6, as the satellite demand (for data) increases over time, the number of resource blocks allocated to the satellite can correspondingly increase.

Figure 7:
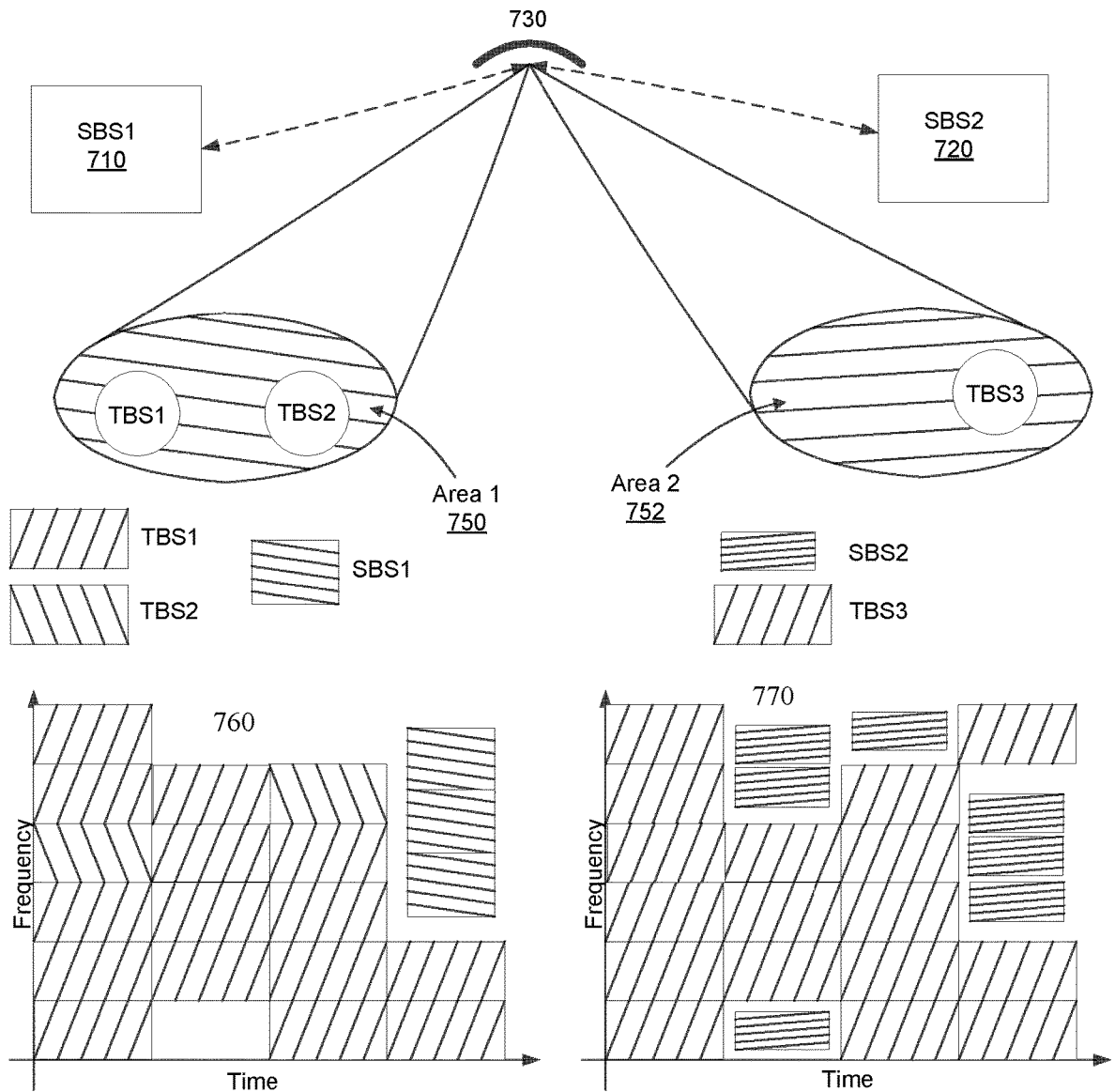
FIG. 7 shows a communication schedule for satellite base stations that have different coverage areas, according to an embodiment.

FIG. 7 shows a communication schedule for satellite base stations that have different coverage areas, according to an embodiment. As shown, satellite base stations 710, 720 have coverage areas 750, 752. While two base stations are shown in FIG. 7, it is to be understood that a single satellite base station may have the two coverage areas (or more) 750, 752. Alternatively, it is possible for the two base stations (or more) to have a single coverage area.

For an exemplary embodiment, the satellite base station 710 provides wireless satellite network coverage in a first area 1 750 and the satellite base station 720 provides wireless satellite network coverage in a second area 2 752. Further, for this exemplary embodiment, the first coverage area 750 overlaps with coverage areas of terrestrial base stations TBS1, TBS2. Further, for this exemplary embodiment, the second coverage area 752 overlaps with the coverage area of terrestrial base station TBS3.

A first communication schedule 760 provides resource block allocation and suppressed resource block information within the first area 1 750. A second communication schedule 770 provides resource block allocation and suppressed resource block information within the second area 1 752.

Figure 8:
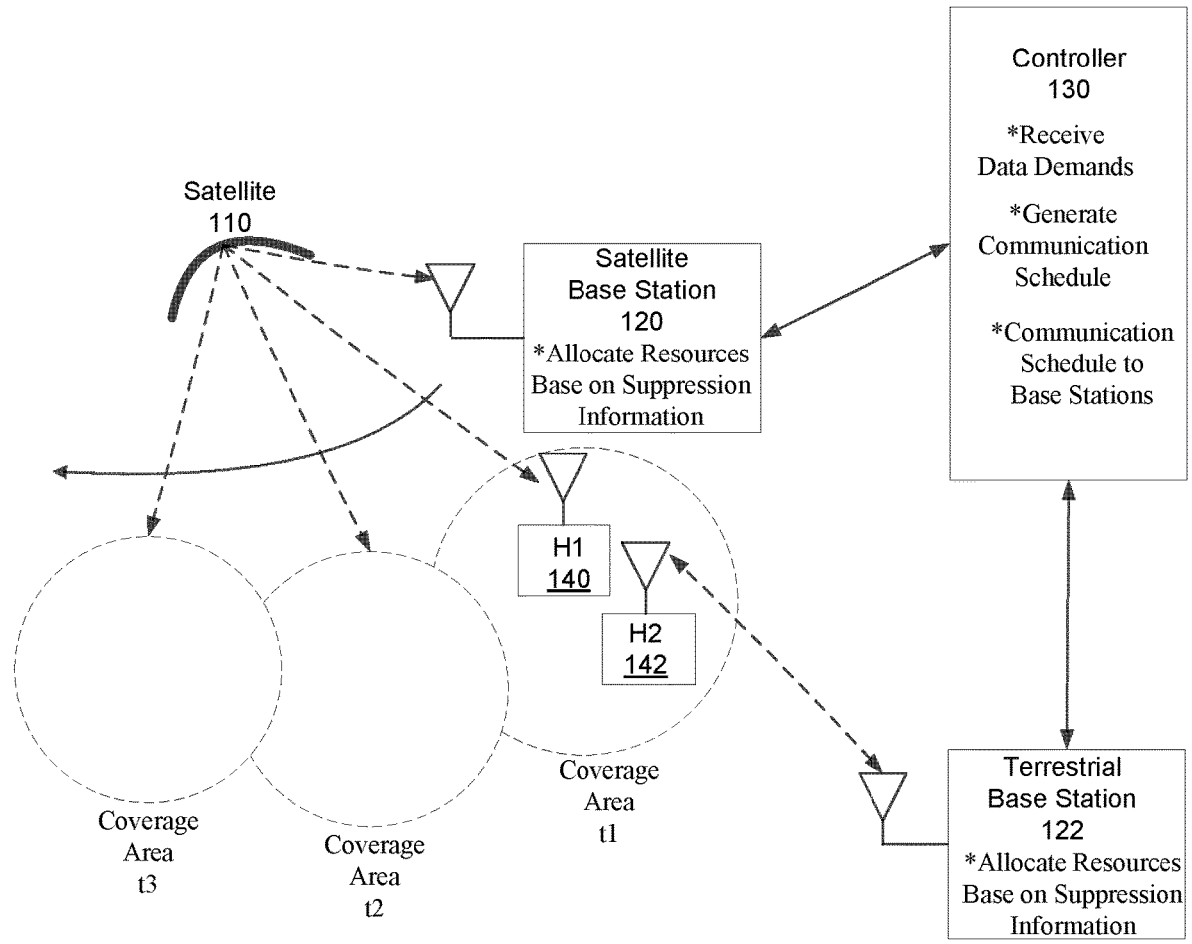
FIG. 8 shows a system for coordinating resource block suppression of satellite and terrestrial networks, wherein a coverage area of the satellite network changes over time, according to an embodiment.

FIG. 8 shows a system for coordinating resource block suppression of satellite and terrestrial networks, wherein a coverage area of the satellite network changes over time, according to an embodiment. The changing coverage area of the satellite base station 120 is adaptively reflected in the communication schedules for the physical coverage areas at the designated times t1, t2, t3. More specifically, the resource blocks and the suppression blocks allocated to the satellite base station 120 are included within the communication schedule temporally proximate with the time t1, but not during the times t2 and t3.

Figure 9:
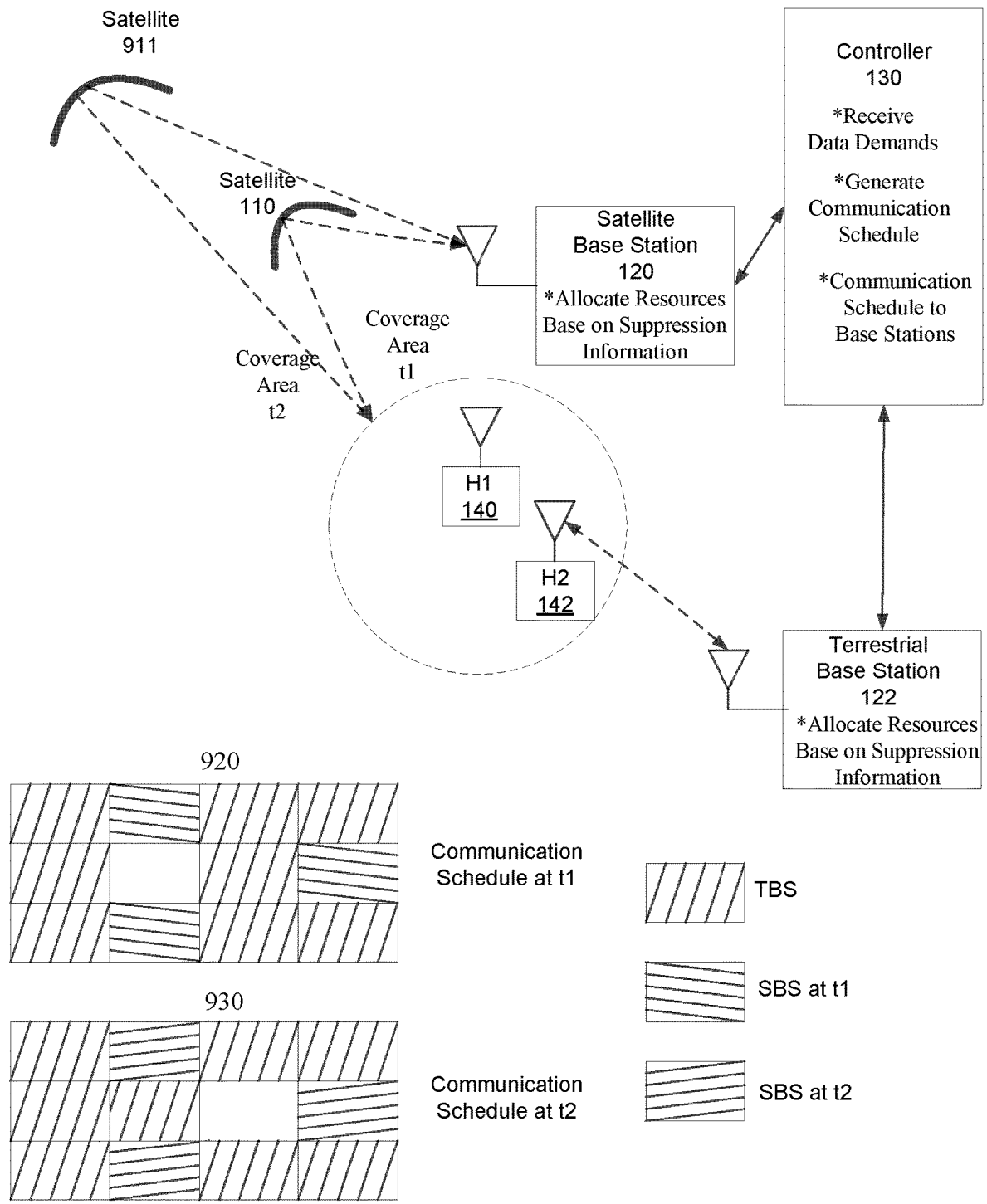
FIG. 9 shows a system for coordinating resource block suppression of satellite and terrestrial networks, wherein different satellites provide wireless access to the coverage area of particular hubs over time, according to an embodiment.

FIG. 9 shows a system for coordinating resource block suppression of satellite and terrestrial networks, wherein different satellites 110, 911 provide wireless access to the coverage area of particular hubs H1 140, H2 142 over time, according to an embodiment. That is, for this exemplary embodiment, the coverage area of the satellite base station 120 is provided by the satellite 110 at time t1, and the same coverage area of the satellite base station 120 is provided by the satellite 911 at time t2.

The exemplary communication schedule 920 includes allocated resource blocks and suppressed resource blocks for the terrestrial base station 122 and the satellite base station 102 at time t1. The exemplary communication schedule 930 includes allocated resource blocks and suppressed resource blocks for the terrestrial base station 122 and the satellite base station 102 at time t2.

Figure 10:
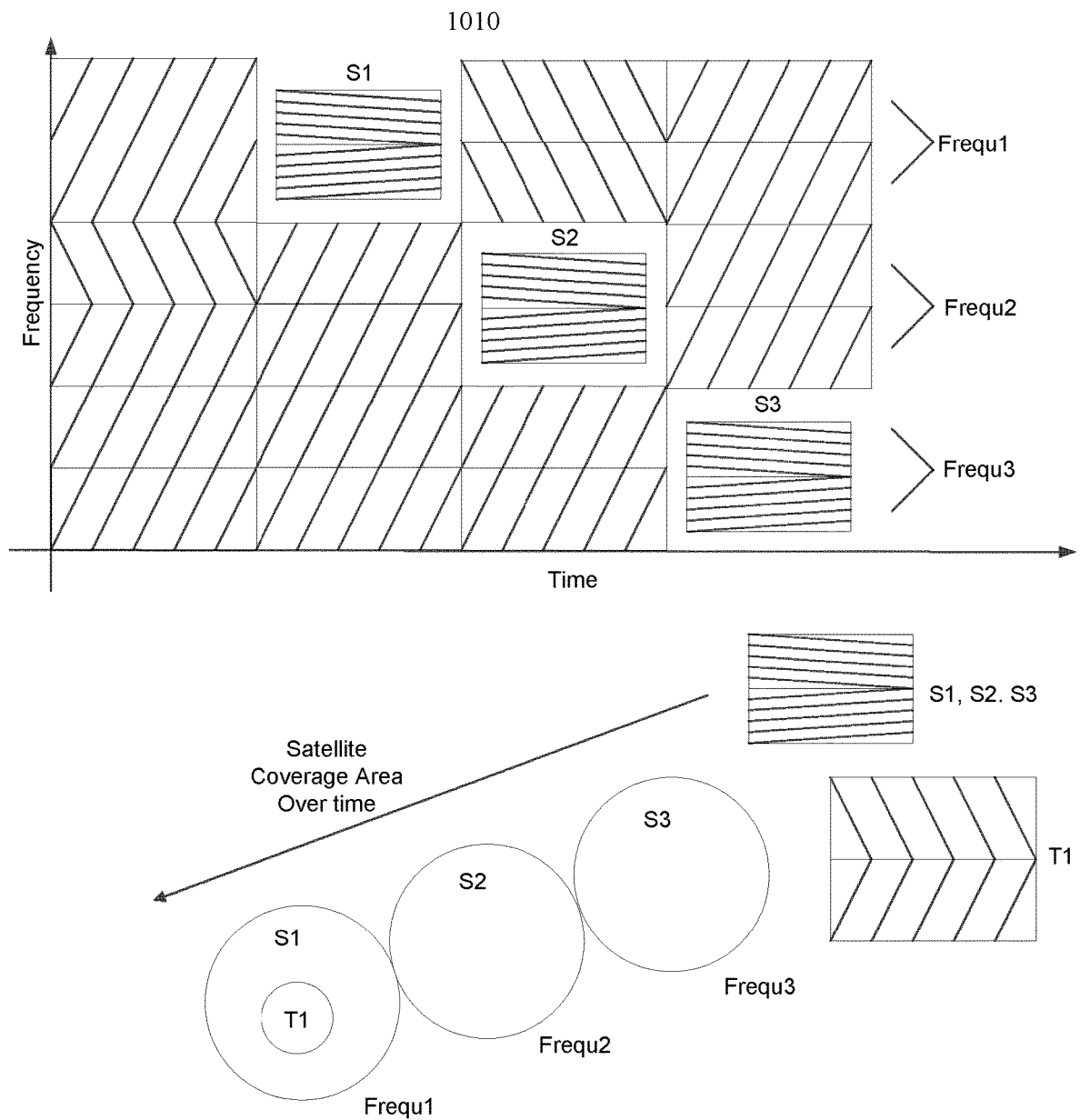
FIG. 10 shows a dynamically updated communication schedule based on a coverage of moving coverage areas of a plurality of satellites of the satellite network and an associated frequency reuse pattern of the plurality of satellites, according to an embodiment.

FIG. 10 shows a dynamically updated communication schedule based on a coverage of moving coverage areas of a plurality of satellites S1, S2, S3 of the satellite network and an associated frequency reuse pattern (Frequ1, Frequ2, Frequ3) of the plurality of satellites, according to an embodiment. The terrestrial service includes wireless communications coverage provided by a terrestrial base station T1. The satellite service includes wireless communications coverage provided by one or more satellite base stations through satellites S1, S2, S3. As shown, the wireless communications coverage of the satellites S1, S2, S3 changes over time. Therefore, the wireless coverage overlap between the terrestrial base station T1 and the coverage areas of the S1, S2, S3 changes over time.

An exemplary communication schedule 1010 includes the allocated resource blocks and the suppressed blocks associated with the satellites S1, S2, S3 and the terrestrial base station T1. One or more satellite base stations may be associated with the satellites S1, S2, S3. As seen in the figure the suppression information communicated to the terrestrial base stations have frequency suppressions which match the frequencies associated with the satellite systems at times in which the satellite systems overlap in coverage area with the terrestrial base station. Also note temporal padding may be used as a satellite enters or exits coverage overlap as there is coverage overlap between satellites. That is, for an embodiment, suppression can occur across multiple frequency bands at the same time. For example, multiple satellites may provide coverage of an area. One of the multiple satellites may be designated at the primary satellite that is maintaining a wireless connection to one or more hubs, and the other satellites of the multiple satellites may be secondary. For an embodiment, the temporal padding is selected to prevent coverage areas of the multiple satellites from interfering with each other. That is, the non-primary satellite has enough temporal padding so that the non-primary satellite can "get out of the way".

FIG. 11 shows coverage areas of a satellite network and of a terrestrial network and shows varying wireless signal power levels of various physical locations within the coverage areas, according to an embodiment. As previously described, for an embodiment, the level of suppression of resource blocks of the terrestrial resource block suppression information of the terrestrial base station and the satellite resource block suppression information of the satellite base station can be based at least in part on a location of the device (hub) that the terrestrial base station and/or the satellite base station is wirelessly communicating. Additionally, or alternatively, the location of the coverage area of the satellite base station and/or the location of the terrestrial base station can be used for determining a level of suppression of the terrestrial resource block suppression information or the satellite resource block suppression information.

FIG. 11 shows a terrestrial base station 1130 and a corresponding terrestrial base station coverage area 1120. FIG. 11 additionally shows a satellite base station coverage area 1110 (wherein the satellite base station is not shown in FIG. 11). It is to be understood that the signal power levels of wireless signal transmitted by the terrestrial base station 1130 vary depending on the location within the terrestrial base station coverage area 1120. For example, typically the signal power level of wireless signals transmitted by the terrestrial base station 1130 decreases for location farther away from the terrestrial base station 1130. Further, the signal power levels of wireless signal transmitted by the satellite base station vary depending upon the location within the satellite base station coverage area 1110.

FIG. 11 shows a path 1140 of possible locations L1, L2, L3 of, for example, a wireless device (hub) within coverage areas 1110, 1120 of the terrestrial base station 1130 and the satellite base station. FIG. 11 further includes a plot 1150 of the satellite signal power and the terrestrial signal power for the exemplary locations L1, L2, L3. That is, the plots show an example of received signal power of a wireless device located at each of the exemplary locations L1, L2, L3.

Due to the varying received signal powers of the wireless signals of the terrestrial base station 1130 and the satellite base station for the different locations, the level(s) of suppression of the terrestrial resource block suppression information of the satellite resource block suppression information can vary as well. As previously described, the suppression of the terrestrial resource block suppression information of the satellite resource block suppression information is selected to mitigate interference between wireless communications of the terrestrial network and the satellite network. As the received signal power of the wireless communications of the terrestrial network and the satellite network varies, the amount of suppression needed to mitigate the interferences varies. Accordingly, for an embodiment, at least one of the satellite resource block suppression information or the terrestrial resource block suppression is generated based on a location of a wireless device located within a coverage area of the terrestrial base station and the satellite base station. Additionally, or alternatively, at least one of the satellite resource block suppression information or the terrestrial resource block suppression is generated based on a location of the terrestrial base station and/or a location of the coverage area of the satellite base station.

Further, the spectral width between resource blocks can be selected based on the location of the wireless device (hub), the location of the terrestrial base station, and/or based on the location of the coverage area of the satellite base station.

Figure 12:
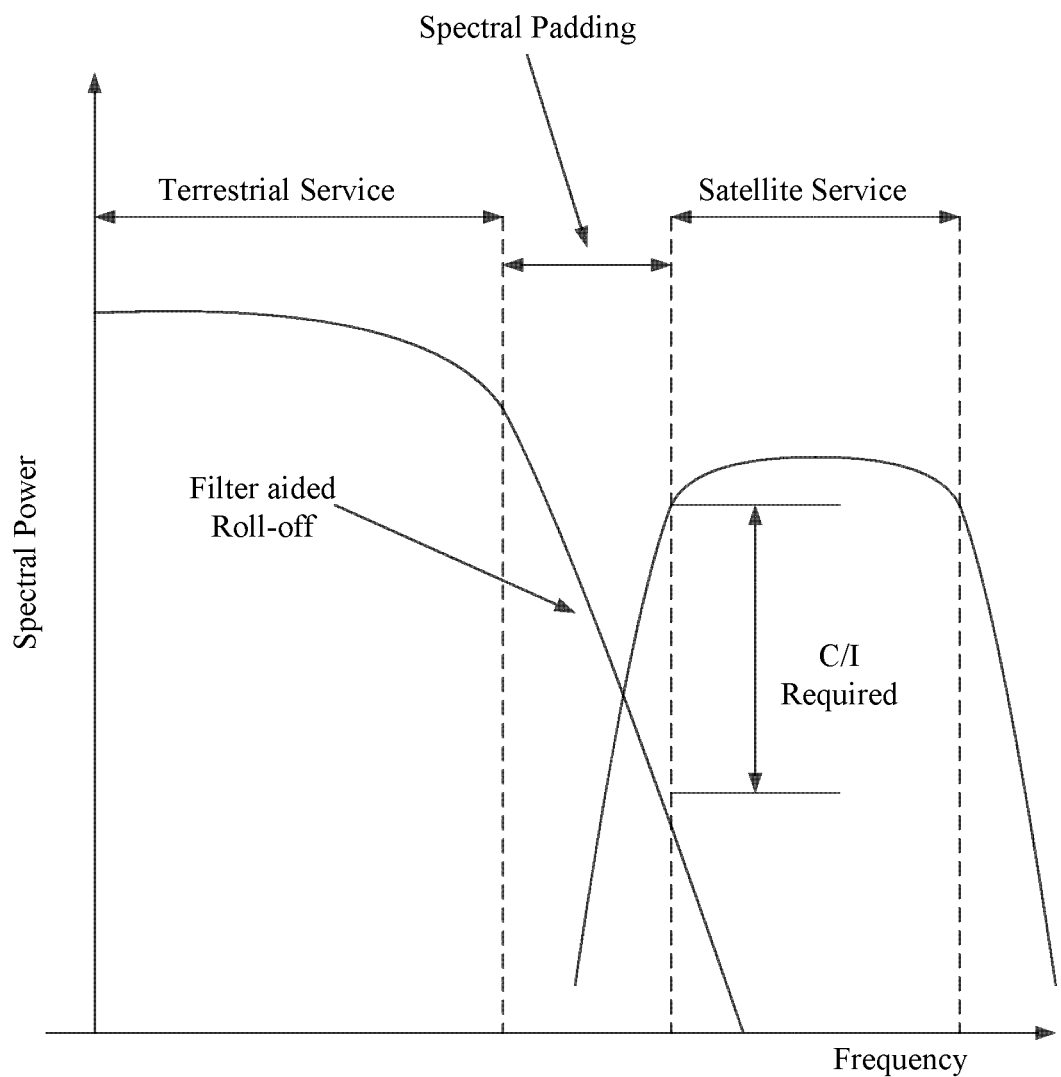
FIG. 12 shows a frequency spectrum of a terrestrial service and a satellite service and the application filtering of transmitted signals to enable suppression requirements, according to an embodiment.

FIG. 12 shows a frequency spectrum of a terrestrial service and a satellite service and the application filtering of transmitted signals to enable suppression requirements, according to an embodiment. As shown, the filter-aided roll-off of the spectral power of communication of the terrestrial service aids in meeting the carrier to interference (C/I) ratio required for the satellite service. Further, as shown, the spectral padding (spectral width) also aids in meeting the carrier to interference (C/I) ratio required for the satellite service. The filtering can be implemented in software or hardware. The requisite amount of filtering can be determined by the defined (selected or required) threshold suppression levels and the power of the transmit signal.

FIG. 13 is a flow chart that includes steps of a method for coordinated satellite and terrestrial base station resource block suppression, according to an embodiment. A first step 1310 includes receiving, by a controller, a data demand of a terrestrial network of a terrestrial base station and a data demand of a satellite network of a satellite base station. A second step 1320 includes generating, by the controller, a communication schedule which contains terrestrial resource block suppression information of the terrestrial base station and satellite resource block suppression information of the satellite base station, wherein the terrestrial resource block suppression information indicates time and frequency blocks of the communication schedule that the terrestrial base station is to suppress wireless communications, and the satellite resource block suppression information indicates time and frequency blocks of the communication schedule that the satellite base station is to suppress wireless communications. A third step 1330 includes allocating, by the terrestrial base station, radio frequency (RF) resources based on the terrestrial resource block suppression information. A fourth step 1340 includes allocating, by the satellite base station, radio frequency (RF) resources based on the satellite resource block suppression information.

As previously described, for an embodiment, the terrestrial resource block suppression information provides an indication to the terrestrial base station how much to suppress wireless communications within indicated time and frequency blocks. As previously described, for an embodiment, the satellite resource block suppression information provides an indication to the satellite base station how much to suppress wireless communications within indicated time and frequency blocks.

As previously described, for an embodiment, the terrestrial resource block suppression information is generated based on a time and frequency reuse pattern of the satellite network. For an embodiment, the terrestrial resource block suppression changes over time based on motion of at least one satellite of the satellite network. For an embodiment, the terrestrial resource block suppression changes over time based on the motion of a plurality of satellites and assigned communication frequencies of each of the plurality of satellites. For an embodiment, the terrestrial resource block suppression changes over time based on the motion of a plurality of satellites, assigned communication frequencies of each of the plurality of satellites, and locations of terrestrial network cell areas (terrestrial base station coverage areas). For an embodiment, the terrestrial resource block suppression and/or the terrestrial resource block suppression changes due to movement of the satellite base station coverage area due to motion of the satellite (for example a LEO satellite). For an embodiment, the terrestrial resource block suppression and/or the terrestrial resource block suppression changes based on a frequency planning color scheme (that is, the communication frequencies of different coverage areas of the terrestrial base stations and of different coverage areas of the satellite base stations). For an embodiment, the terrestrial resource block suppression and/or the terrestrial resource block suppression changes based on satellite beam planning and the changing coverage area of the satellite with time. That is, the coverage area of a satellite base station may cover an area as defined by a beam between the coverage area and the satellite associated with the satellite base station. The beam may form a spot beam that moves very fast and includes dynamic beam hopping. The beam may move from one coverage area to another. As an example, a satellite network may use a 4 color scheme for frequency reuse, and as a result different terrestrial base stations will have different resource blocks suppressed depending upon the geography of the terrestrial base stations to coordinate with the satellite's use of the frequency spectrum. For an embodiment, the satellite resource block suppression information is generated based on a time and frequency reuse pattern of the terrestrial network, such as, shown in FIG. 10.

At least some embodiments include allocating a spectral width within time and frequency blocks suppressed by the satellite base station to the terrestrial base station based on at least one of a power density, a service roll off, and/or SINR requirements of the wireless signals of wireless communications of the terrestrial network and the satellite network. For an embodiment, the spectral width is selected to satisfy interference thresholds between the wireless signals of the terrestrial network and wireless signals of the satellite network. For an embodiment, the spectral width is selected based upon the prescribed suppression threshold levels and the interference tolerance of the terrestrial and satellite wireless services. For an embodiment, the spectral width is selected according to a channel to interference ratio. For an embodiment, the spectral width and additional filtering are selected to improve the rejection ratio to meet interference tolerance requirements. For an embodiment, the spectral width is dynamically adjusted by the controller based on the sensed interference, signal quality, data demand, geographical and/or environment changes.

At least some embodiments include allocating a spectral width (padding) within time and frequency blocks suppressed by the terrestrial base station to the satellite base station based on at least one of a power density, a service roll off, and/or SINR requirements of the wireless signals of wireless communications of the terrestrial network and the satellite network.

At least some embodiments include allocating a temporal width (padding) within time and frequency blocks suppressed by the satellite base station to the terrestrial base station based on propagation delays of wireless communications of the terrestrial network and the satellite network. For an embodiment, the temporal width is additionally dependent on satellite motion. For example, when a LEO satellite is moving from one coverage area to another coverage area, there are time periods when multiple satellites are covering an area simultaneously. For this situation, temporal padding can be used to minimize interference. Further, there can be time periods when none of the satellites are covering the area, or one satellite can be covering half of the area and another satellite is covering the other half of the area.

At least some embodiments include allocating a temporal width within time and frequency blocks suppressed by the terrestrial base station to the satellite base station based on propagation delays of wireless communications of the terrestrial network and the satellite network.

At least some embodiments include the terrestrial base station dynamically applying a filtering response to transmitted signals according to the terrestrial resource block suppression information. At least some embodiments include the satellite base station dynamically applying a filtering response to transmitted signals according to the satellite resource block suppression information. For an embodiment, the filtering is selected according to the defined threshold suppression level. The filtering may be applied using hardware or software implementations of the filtering.

At least some embodiments further include collecting, by the controller, characteristics of the terrestrial network and the satellite network, and generating the communication schedule based at least in part on the collected characteristics. The collected characteristics may include network traffic. For example, if the satellite network traffic is high the terrestrial network is suppressed more, and vice versa. Further, an embodiment includes a priority scheme between the two.

For an embodiment, a temporal location of suppressed blocks of the terrestrial resource block suppression information is dependent on a time urgency (priority) of communication of the satellite network, and a temporal location of suppressed blocks of the satellite resource block suppression information is dependent on a time urgency (priority) of communication of the terrestrial network.

At least some embodiments further include dynamically updating the communication schedule based on a coverage of the satellite network and an associated frequency reuse pattern. For example, for satellite coverage area motion as shown in FIG. 8, the satellite creates a checkerboard style of a frequency reuse pattern. When the satellites are not geostationary the checkerboard pattern then moves across the coverage area of the terrestrial base station, and the controller then must dynamically update the suppression information for the terrestrial base station.

At least some embodiments further include sharing, by the controller, the communication schedule with the terrestrial base station and the satellite base station. The terrestrial base station then allocates resources around the terrestrial resource block suppression information, and the satellite base station then allocates resources around the satellite resource block suppression information.

At least some embodiments further include contesting, by at least one of the terrestrial base stations or satellite base stations, resource block suppression information provided by the controller.

At least some embodiments further include communicating, by at least one of the terrestrial base stations or satellite base stations, a preference for particular time ranges or spectral ranges. The controller can then choose a suppression scheme that satisfies these preferences, or not.

FIG. 14 is a flow chart that includes steps of a method for coordinated satellite and terrestrial base station resource blocks, according to an embodiment. While the described embodiments include generating a communication schedule which contains terrestrial resource block suppression information of the terrestrial base station and satellite resource block suppression information of the satellite base station. It is to be understood that the communication schedule can be configured to allocate resource blocks within the communication schedule that are allocated to either the terrestrial base station and/or the satellite base station. The terrestrial base station can then determine the suppressed resource blocks as the resource blocks of the communication schedule that are not allocated to the terrestrial base station, and the satellite base station can then determine the suppressed resource blocks as the resource blocks of the communication schedule that are not allocated to the satellite base station. The features of the described embodiments that apply to the suppressed resource block then apply. Accordingly, for an embodiment, a first step 1410 includes receiving, by a controller, a data demand of a terrestrial network of a terrestrial base station and a data demand of a satellite network of a satellite base station. A second step 1420 includes generating, by the controller, a communication schedule which contains terrestrial resource block information of the terrestrial base station and satellite resource block information of the satellite base station, wherein the terrestrial resource block information indicates time and frequency blocks of the communication schedule that the terrestrial base station is only allowed to use for wireless communications, and the satellite resource block information indicates time and frequency blocks of the communication schedule that the satellite base station is only allowed to use for wireless communication, wherein the time and frequency blocks of the terrestrial resource block information do not overlap with the time and frequency blocks of the satellite resource block information. A third step 1430 includes allocating, by the terrestrial base station, radio frequency (RF) resources based on the terrestrial resource block information. A fourth step 1440 includes allocating, by the satellite base station, radio frequency (RF) resources satellite the satellite resource block information.

Although specific embodiments have been described and illustrated, the embodiments are not to be limited to the specific forms or arrangements of parts so described and illustrated. The described embodiments are to only be limited by the claims.

What is claimed:

1. A method, comprising:
   receiving, by a controller, a data demand of a terrestrial network of a terrestrial base station and a data demand of a satellite network of a satellite base station;
   generating, by the controller, a communication schedule which contains terrestrial resource block suppression information of the terrestrial base station and satellite resource block suppression information of the satellite base station, wherein the terrestrial resource block suppression information indicates time and frequency blocks of the communication schedule that the terrestrial base station is to suppress wireless communications, and the satellite resource block suppression information indicates time and frequency blocks of the communication schedule that the satellite base station is to suppress wireless communications;
   allocating, by the terrestrial base station, radio frequency (RF) resources based on the terrestrial resource block suppression information; and
   allocating, by the satellite base station, radio frequency (RF) resources based on the satellite resource block suppression information.

2. The method of claim 1, wherein the terrestrial resource block suppression information provides an indication to the terrestrial base station how much to suppress wireless communications within indicated time and frequency blocks.

3. The method of claim 1, wherein the satellite resource block suppression information provides an indication to the satellite base station how much to suppress wireless communications within indicated time and frequency blocks.

4. The method of claim 1, wherein the terrestrial resource block suppression information is generated based on a time and frequency reuse pattern of the satellite network.

5. The method of claim 1, wherein the terrestrial resource block suppression changes over time based on motion of at least one satellite of the satellite network.

6. The method of claim 5, wherein the terrestrial resource block suppression changes over time based on the motion of a plurality of satellites and assigned communication frequencies of each of the plurality of satellites.

7. The method of claim 5, wherein the terrestrial resource block suppression changes over time based on the motion of a plurality of satellites, assigned communication frequencies of each of the plurality of satellites, and locations of terrestrial network cell areas.

8. The method of claim 1, wherein the satellite resource block suppression information is generated based on a time and frequency reuse pattern of the terrestrial network.

9. The method of claim 1, wherein at least one of the satellite resource block suppression information or the terrestrial resource block suppression is generated based a location of a wireless device located within a coverage area of the terrestrial base station and the satellite base station.

10. The method of claim 1, further comprising allocating a spectral width within time and frequency blocks suppressed by the satellite base station to the terrestrial base station based on at least one of a power density, and SINR requirements of wireless communications of the terrestrial network and the satellite network.

11. The method of claim 1, further comprising allocating a spectral width within time and frequency blocks suppressed by the terrestrial base station to the satellite base station based on at least one of a power density, and SINR requirements of wireless communications of the terrestrial network and the satellite network.

12. The method of claim 1, further comprising allocating a temporal width within time and frequency blocks suppressed by the satellite base station to the terrestrial base station based on propagation delays of wireless communications of the terrestrial network or the satellite network.

13. The method of claim 1, further comprising allocating a temporal width within time and frequency blocks suppressed by the terrestrial base station to the satellite base station based on propagation delays of wireless communications of the terrestrial network and the satellite network.

14. The method of claim 1, further comprising the terrestrial base station dynamically applying a filtering response to transmitted signals according to the terrestrial resource block suppression information.

15. The method of claim 1, further comprising:
    collecting, by the controller, characteristics of the terrestrial network and the satellite network; and
    generating the communication schedule based at least in part on the collected characteristics.

16. The method of claim 1, wherein a temporal location of suppressed blocks of the terrestrial resource block suppression information is dependent on a time urgency of communication of the satellite network, and a temporal location of suppressed blocks of the satellite resource block suppression information is dependent on a time urgency of communication of the terrestrial network.

17. The method of claim 1, further comprising dynamically updating the communication schedule based on a coverage of the satellite network and an associated frequency reuse pattern.

18. The method of claim 1, further comprising:
sharing, by the controller, the communication schedule with the terrestrial base station and the satellite base station;
allocating, by the terrestrial base station, resources around the terrestrial resource block suppression information; and
allocating, by the satellite base station, resources around the satellite resource block suppression information.

19. The method of claim 1, further comprising:
contesting, by at least one of the terrestrial base station or the satellite base station, resource block suppression information provided by the controller.

20. The method of claim 1, further comprising:
communicating, by at least one of the terrestrial base station or the satellite base station, a preference for particular time ranges or spectral ranges.

21. A wireless system, comprising:
a terrestrial base station, a satellite base station, and a controller;
the controller configured to:
receive a data demand of a terrestrial network of the terrestrial base station and a data demand of a satellite network of the satellite base station; and
generate a communication schedule which contains terrestrial resource block suppression information of the terrestrial base station and satellite resource block suppression information of the satellite base station, wherein the terrestrial resource block suppression information indicates time and frequency blocks of the communication schedule that the terrestrial base station is to suppress wireless communications, and the satellite resource block suppression information indicates time and frequency blocks of the communication schedule that the satellite base station is to suppress wireless communications;
the terrestrial base station configured to allocate radio frequency (RF) resources based on the terrestrial resource block suppression information; and
the satellite base station configured to allocate radio frequency (RF) resources based on the satellite resource block suppression information.

* * * * *